United States Patent
Lengsfeld et al.

(10) Patent No.: US 8,734,711 B2
(45) Date of Patent: May 27, 2014

(54) METHOD FOR PRODUCING A PROFILE FROM COMPOSITE FIBER MATERIAL

(75) Inventors: Hauke Lengsfeld, Helmste (DE); Wolfgang Cruys, Stade (DE); Roland Brandenburg, Tostedt (DE); René Schroeder, Buxtehude (DE); Hans Marquardt, Fredenbeck (DE)

(73) Assignee: Airbus Operations GmbH, Hamburg (DE)

(*) Notice: Subject to any disclaimer, the term of this patent is extended or adjusted under 35 U.S.C. 154(b) by 794 days.

(21) Appl. No.: 12/808,284

(22) PCT Filed: Nov. 7, 2008

(86) PCT No.: PCT/EP2008/065114
§ 371 (c)(1), (2), (4) Date: Aug. 30, 2010

(87) PCT Pub. No.: WO2009/083318
PCT Pub. Date: Jul. 9, 2009

(65) Prior Publication Data
US 2010/0314807 A1    Dec. 16, 2010

(30) Foreign Application Priority Data
Dec. 28, 2007 (DE) .......................... 10 2007 062 872

(51) Int. Cl.
B29C 70/44 (2006.01)
(52) U.S. Cl.
USPC ........................................................ 264/571
(58) Field of Classification Search
USPC ........................................................ 264/571
See application file for complete search history.

(56) References Cited

U.S. PATENT DOCUMENTS

| | | | |
|---|---|---|---|
| 5,874,152 A * | 2/1999 | Middelman | 428/105 |
| 6,523,246 B1 | 2/2003 | Matsui et al. | 29/559 |
| 2001/0040317 A1 | 11/2001 | Shiraishi et al. | 264/510 |

(Continued)

FOREIGN PATENT DOCUMENTS

| | | |
|---|---|---|
| CN | 1257454 A | 6/2000 |
| CN | 1403350 A | 3/2003 |

(Continued)

OTHER PUBLICATIONS

English translation of first Chinese Office Action for Chinese Application No. 2008801233143, issued Jul. 4, 2012, 6 pages.

*Primary Examiner* — Ryan Ochylski
(74) *Attorney, Agent, or Firm* — Westman, Champlin & Koehler, P.A.

(57) ABSTRACT

The present invention provides a method for producing a profile from composite fiber material, in particular in the aviation and aerospace field, having the following steps: A preliminary fabric, particularly made of pre-impregnated fiber material, is first packed in a vacuum bag. Then support elements are laid on the packed preliminary fabric to support the latter. The vacuum bag is then supplied with a vacuum. Next, the preliminary fabric is hardened to the profile under the action of heat, in particularly in an autoclave. With the claimed method the support elements can be formed advantageously from favorable material, in particular aluminum, instead of highly expensive nickel-36 steel, since the support elements are uncoupled mechanically from the preliminary fabric in a longitudinal direction by means of the vacuum bag, enabling movement of the support elements in the longitudinal direction relative to the preliminary fabric.

2 Claims, 2 Drawing Sheets

(56) References Cited

U.S. PATENT DOCUMENTS

| | | | |
|---|---|---|---|
| 2002/0022422 A1* | 2/2002 | Waldrop et al. | 442/179 |
| 2002/0027187 A1* | 3/2002 | Sato et al. | 249/187.1 |
| 2007/0063393 A1* | 3/2007 | Vernin et al. | 264/511 |
| 2007/0151657 A1 | 7/2007 | Garate Fel et al. | 156/212 |
| 2007/0175171 A1* | 8/2007 | Delgado et al. | 52/741.1 |
| 2010/0314042 A1* | 12/2010 | Luebbering et al. | 156/286 |

FOREIGN PATENT DOCUMENTS

| | | |
|---|---|---|
| EP | 0 368 734 | 11/1989 |
| WO | WO 2006/131532 | 12/2006 |
| WO | WO 2007/077265 | 7/2007 |

\* cited by examiner

METHOD FOR PRODUCING A PROFILE FROM COMPOSITE FIBER MATERIAL

CROSS-REFERENCE TO RELATED APPLICATIONS

This application is a Section 371 National Stage Application of International Application No. PCT/PCT/EP2008/065114, filed Nov. 7, 2008 and published as WO 2009/083318 on Jul. 9, 2009, in English, which claims the benefit of German Patent Application No. 10 2007 062 872.4, filed Dec. 28, 2007, the entire disclosure of which is herein incorporated by reference.

FIELD OF THE INVENTION

The present invention relates to a method for the production of a profile from fibre composite material.

Although the present invention and the problem on which it is based are suitable for the production of any profiles, they will be described in detail in respect of stringers of an aircraft.

According to a method known to the Applicant for the production of profiles, for example stringers, a preliminary fabric consisting of fibre composite material is initially deposited on a laminating device. Support elements are then positioned on the preliminary fabric which support said preliminary fabric and thus hold it in the desired shape of the stringer to be produced. Thereafter, the preliminary fabric together with the support elements are wrapped in a vacuum bag and said vacuum bag is subjected to a vacuum. Finally, the arrangement comprising the vacuum bag with the preliminary fabric arranged therein and the support elements is cured in an autoclave with the application of pressure and heat.

Fibre composite materials, particularly with carbon fibres, have a very low thermal expansion coefficient. Consequently, the support elements which are supporting the preliminary fabric and which are in direct contact with the preliminary fabric, must also be formed from a material which has a very low thermal expansion coefficient, as otherwise the preliminary fabric will undergo an undesirable distortion due to the interaction between the preliminary fabric and the support elements. Materials which have a very low thermal expansion coefficient, for example nickel-36 steel, are very expensive. Furthermore, the support elements must have a very specific shape depending on the shape of the profile to be produced. In the case of support elements consisting of nickel-36 steel, this in turn requires a very complex mechanical processing, because nickel-36 steel is very hard. Particularly in the production of streamlined profiles, which are profiles of this type which bend in their longitudinal direction, the expenditure for the mechanical processing of the support elements is very high.

SUMMARY OF THE INVENTION

Therefore, it is the object of the present invention to provide an improved method for the production of a profile from fibre composite material which manages in particular without the very expensive support elements described above.

This object is achieved by a method which has the features of claim 1.

According thereto, a method is provided for the production of a profile from fibre composite material, in particular in the aerospace sector, comprising the following steps: First of all, a preliminary fabric is wrapped in a vacuum bag. Then at least one support element is positioned on the wrapped preliminary fabric to support it. The vacuum bag is then subjected to a vacuum. Furthermore, the preliminary fabric is then cured to form the profile.

The idea on which the invention is based lies in the understanding that the vacuum bag allows a movement of the at least one support element relative to the preliminary fabric when the at least one support element and the preliminary fabric are arranged on opposite sides of the vacuum bag. Therefore, this avoids a mechanical interaction between the preliminary fabric and the at least one support element which could result in a distortion of the preliminary fabric. Consequently, economical materials, for example aluminium sheets and steel sheets which can also be easily brought mechanically into the desired shape can be used as the material for the support elements. Alternatively, support elements made of plastics materials, in particular extruded profiles consisting of plastics materials, are also conceivable. Thus, a method for producing a profile from fibre composite material is provided which is very much more economical than the known method. In particular, streamlined profiles can thus be advantageously produced.

Advantageous developments and embodiments of the invention are provided in the subclaims.

The term "preliminary fabric" as used herein is understood as meaning any type of fibre material, in particular fibre-woven fabrics, fibrous tissues or fibre felt. The fibres can be formed, for example, as carbon fibres, glass fibres or aramide fibres. The fibre material is preferably already pre-impregnated with a resin matrix. However, it can likewise be provided that the fibre material is only infiltrated with the resin matrix, for example by an infusion process, after the preliminary fabric has been wrapped and the at least one support element has been positioned, and is then cured to form the profile. The resin matrix is preferably an epoxy resin.

According to a preferred development of the method according to the invention, the at least one support element is formed from aluminium or steel, in particular from an aluminium sheet or steel sheet. Of course, aluminium is to include all aluminium alloys. Aluminium and steel are relatively inexpensive and can also be easily reworked mechanically into the support elements with the desired shape, thereby making it possible to reduce costs further. In particular, support elements made of sheet metal can be easily bent for the production of streamlined profiles.

According to a further preferred development of the method according to the invention, the preliminary fabric is configured with a web, and two support elements which are configured in particular as L-shaped profiles to support the web between them are positioned on the wrapped preliminary fabric. In this respect, the longitudinal axis of the L-shaped profiles extends substantially parallel to the longitudinal axis of the preliminary fabric. The web of the preliminary fabric is dimensionally relatively unstable and therefore the support is needed on opposite sides.

The term "longitudinal axis" of a component as used herein is understood as meaning the axis along which the cross section of the component varies only insignificantly.

According to a further preferred development of the method according to the invention, the two support elements are held relative to one another by a rubber roof profile, two triangular profiles and an adhesive tape connecting them, a clamp and/or a further vacuum bag. The term "rubber roof profile" as used herein is understood as meaning a resilient profile with a support surface and a recess in said support surface, which recess extends in the longitudinal direction of the rubber roof profile. The recess, in particular groove, is configured to resiliently receive the web of the profile together with the portions, supporting the web, of the support elements. The rubber roof profile is particularly suitable for the production of T-profiles. A merely relative mutual fixing of the support elements avoids tensions which arise in elements with a high thermal expansion coefficient when they are respectively fixed at two mutually stationary points. In general, rubber roof profiles, triangular profiles with adhesive tapes, clamps and vacuum bags are very easy to handle compared to the heavy, presently used tools made of nickel-36 steel.

According to a further preferred development, the wrapped preliminary fabric together with the at least one support element are wrapped in a further vacuum bag, in which case the vacuum applied to the further vacuum bag is set to be less than or the same as the vacuum in the vacuum bag. The term "vacuum" as used herein is understood as meaning the value of the difference between atmospheric pressure and the prevailing, absolute pressure. The above development provides that the vacuum bag rests tightly against the preliminary fabric and is not deformed in the direction of the second vacuum bag due to the pressure prevailing therein, which would adversely affect the material characteristics of the cured fibre composite material.

BRIEF DESCRIPTION OF THE DRAWINGS

In the following, the invention is described in detail on the basis of embodiments with reference to the accompanying figures.

DESCRIPTION OF EXEMPLARY EMBODIMENTS

Figure 1:
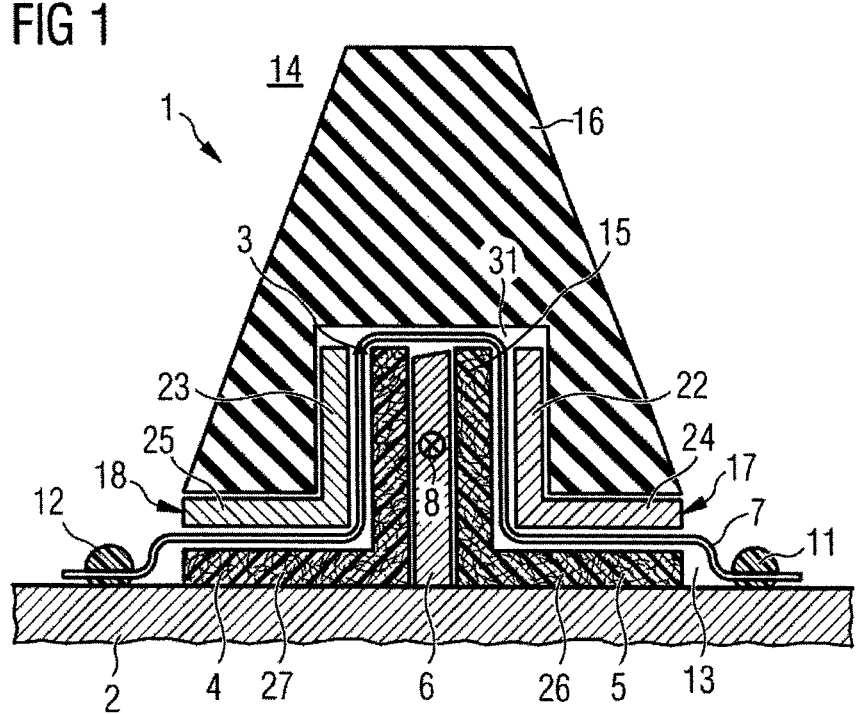
FIG. 1 shows a state of a method according to an embodiment of the present invention.

In the figures, the same reference numerals denote the same or functionally identical components, unless indicated otherwise.

FIG. 1 is a cross-sectional view of an arrangement 1 for the production of a profile configured as a T-stringer.

The arrangement 1 has a laminating device 2, on which is arranged a preliminary fabric 3 with a T-shaped cross section, consisting of two parts 4, 5 with in each case an L-shaped cross section and a blade 6 arranged in between.

According to the present embodiment, the preliminary fabric 3 consists of a carbon fibre-woven fabric which has been pre-impregnated with an epoxy resin matrix, i.e. the epoxy resin matrix is in the uncured state. The preliminary fabric 3 extends substantially vertically to the plane of the paper along the longitudinal axis 8. The preliminary fabric 3 can also be configured to be streamlined.

The preliminary fabric is wrapped in a vacuum bag 7 which is sealed off from the laminating device 2 by sealing means 11, 12. Prevailing in the interior 13 of the vacuum bag 7 is a vacuum P1, i.e. a low pressure compared to the pressure P0 which prevails in the atmosphere 14.

A web 15 of the preliminary fabric 3 is held in the position shown in FIG. 1 by a rubber roof profile 16 and two support elements 17, 18.

The support elements 17, 18 are each formed from an aluminium sheet with an L-shaped cross section. The support elements 17, 18 are positioned such that they can be displaced while sliding in the longitudinal direction 8 with respect to the vacuum bag 7, portions 22, 23 of the support elements 17 and 18 supporting the stringer web 15 and portions 24, 25 of the support elements 17 and 18 resting on the two foot portions 26 and 27 of the preliminary fabric 3.

The rubber roof profile 16 has a recess 31 which extends in the longitudinal direction 8 and in which the web 15 is received with the portions 22, 23 between side surfaces of the recess 31. Resting against support surfaces which extend substantially vertically to the side surfaces of the recess 31 is the rubber roof profile on the portions 24 and 25 of the support elements 17 and 18.

The rubber roof profile 16 is inverted over the web 15 together with the portions 22, 23 of the support elements 17, 18, the rubber roof profile 16 being resiliently widened, and thus fixes these support elements 17, 18 relative to one another, as a result of which the stringer web 15 is held in shape, as shown in FIG. 1. In this respect, the side surfaces produce a slight resilient pressure against the portions 22 and 23 of the support elements 17 and 18.

The arrangement 1 is then subjected to heat (and possibly pressure), preferably in an autoclave. This cures the preliminary fabric 3 to produce a T-stringer.

Figure 2:
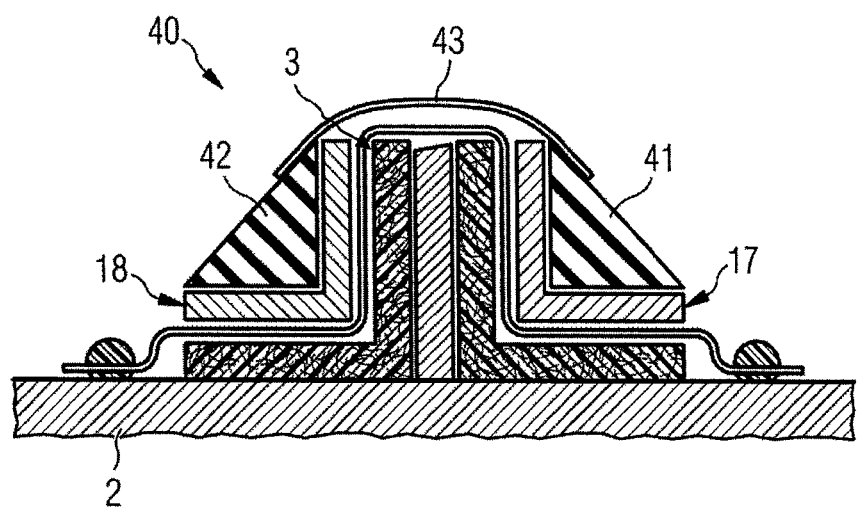
FIG. 2 shows a state of a method according to a further embodiment of the present invention.

The arrangement 40 of FIG. 2 only differs from that of FIG. 1 in that the rubber roof profile 16 is replaced by two triangular profiles 41, 42 and by an adhesive tape 43 which connects them. The triangular profiles 41, 42 are preferably formed from a rubber material and engage into the support elements 17, 18 to hold them in position in conjunction with the adhesive tape 43.

Figure 3:
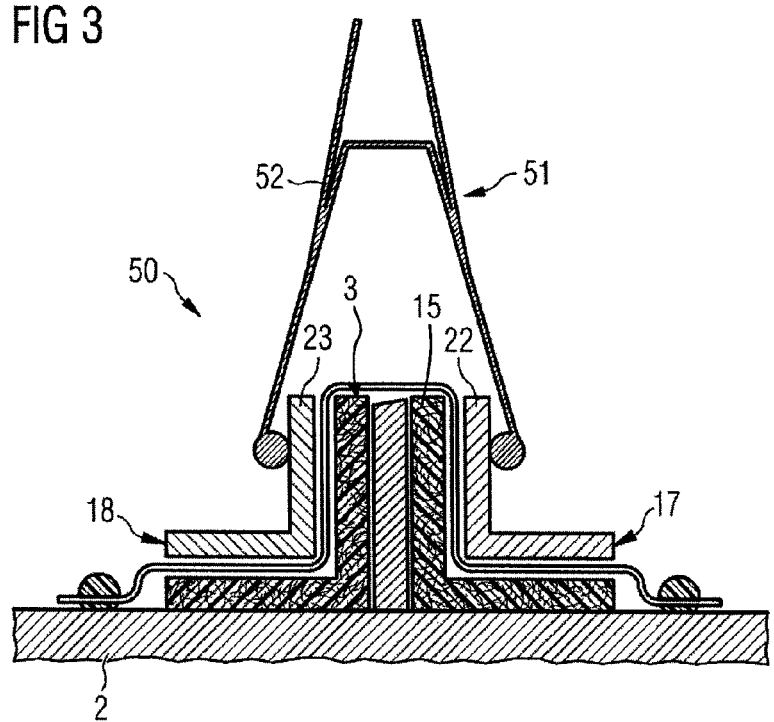
FIG. 3 shows a state of a method according to a further embodiment of the present invention.

In the arrangement 50 in FIG. 3, a clamp 51 is provided instead of the rubber roof profile 16 according to the embodiment of FIG. 1, which clamp 51 presses the portions 22, 23 of the support elements 17 and 18 against the web 15 of the preliminary fabric 3 with a slight force, for which the bow 52 of the clamp 51 is preferably formed from a resilient material.

Figure 4:
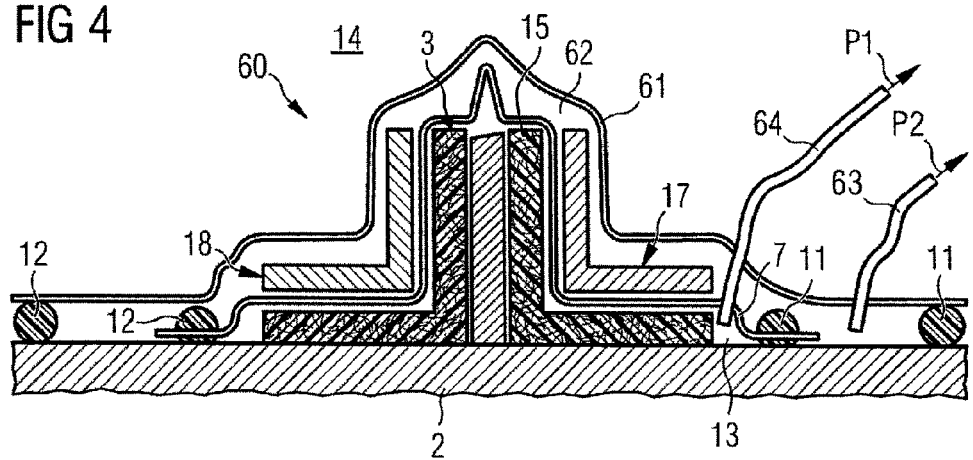
FIG. 4 shows a state of a method according to a further embodiment of the present invention.

In the arrangement 60 in FIG. 4, a further vacuum bag 61 is provided instead of the rubber roof profile 16 according to the embodiment of FIG. 1, which vacuum bag 61 receives in its interior 62 the preliminary fabric 3 together with the vacuum bag 7 and the support elements 17, 18. A vacuum P2 prevails in the interior 62 of the further vacuum bag 61. The vacuum P1 can be applied to the interior 13 of the vacuum bag 7 and the vacuum P2 can be applied to the interior 62 of the vacuum bag 61 by hoses 63, 64, for example, which are each connected to a vacuum pump (not shown).

The following relationship should apply to the vacuums P1 and P2:

$$P1 \geq P2$$

For example, P1=100 kPa and P2=25 kPa, P1 and P2 being measured relative to the atmospheric pressure P0.

In the embodiment according to FIG. 4, with prevailing vacuums P1 and P2, the vacuum bag 61 presses the support elements 17, 18 against the web 15 to support it.

Common to the embodiments according to FIGS. 1 to 4 is the fact that instead of the pre-impregnated preliminary fabric 3, dry fibre material can also be used at any time which can be infiltrated with a resin matrix after the positioning of the support elements 17, 18 and before the application of heat and/or pressure to the arrangements 1, 40, 50 and 60 respectively.

Although the invention has been described on the basis of a plurality of embodiments, it is not restricted thereto, but can be modified in many different ways.

The present invention provides a method for the production of a profile from fibre composite material, in particular in the aerospace sector, comprising the following steps: First of all, a preliminary fabric, in particular of pre-impregnated fibre material, is wrapped in a vacuum bag. Support elements are then positioned on the wrapped preliminary fabric to support it. Thereafter, the vacuum bag is subjected to a vacuum. Furthermore, the preliminary fabric is then cured under the effect of heat, in particular in an autoclave, to produce the profile. In the method according to the invention, the support elements can advantageously be formed from a favourable material, in particular aluminium, instead of very expensive nickel-36 steel, because the support elements are mechanically uncoupled from the preliminary fabric in the longitudinal direction by the vacuum bag, thereby allowing a movement of the support elements in the longitudinal direction relative to the preliminary fabric.

LIST OF REFERENCE NUMERALS 1 arrangement
2 laminating device
3 preliminary fabric
4 part
5 part
6 blades
7 vacuum bag
8 longitudinal direction
11 sealing means
12 sealing means
13 interior
14 atmosphere
15 web
16 rubber roof profile
17 support element
18 support element
22 portion
23 portion
24 portion
25 portion
26 foot portion
27 foot portion
31 recess
40 arrangement
41 triangular profile
42 triangular profile
43 adhesive tape
50 arrangement
51 clamp
52 bow
60 arrangement
61 further vacuum bag
62 interior
63 hose
64 hose
P0 atmospheric pressure
P1 pressure in vacuum bag 7
P2 pressure in further vacuum bag 61

The invention claimed is:

1. Method for the production of a profile from fibre composite material, comprising the following steps:
wrapping in a vacuum bag a preliminary fabric which is configured with a T-shaped cross section and has a web and foot portions;
positioning two support elements configured with an L-shaped cross section on the wrapped preliminary fabric for the support thereof such that the support elements are positioned such that they can be displaced while sliding in the longitudinal direction with respect to the vacuum bag, wherein portions of the support elements support the web of the preliminary fabric and portions of the support elements rest on the foot portions of the preliminary fabric;
charging the vacuum bag with a vacuum;
inverting a rubber roof profile with a recess extending in the longitudinal direction onto the support elements such that the web of the preliminary fabric, together with the portions supporting the web of the support elements, is received between side surfaces of the recess, and support surfaces of the rubber roof profile which extend vertically to the side surfaces rest on the portions, positioned on the foot portions, of the support elements, the rubber roof profile being resiliently widened and the support elements being fixed relative to one another; and
curing the preliminary fabric to form the profile, wherein the wrapped preliminary fabric together with the at least one support element are wrapped in a further vacuum bag, in which case the vacuum applied to the further vacuum bag is set to be less than or the same as the vacuum in the vacuum bag.

2. Method according to claim 1, characterized in that the two support elements are formed from aluminium or steel.

* * * * *